US009647877B2

(12) United States Patent
Tahara et al.

(10) Patent No.: US 9,647,877 B2
(45) Date of Patent: May 9, 2017

(54) NETWORK SYSTEM, MASTER DEVICE, AND METHOD FOR CONTROLLING NETWORK SYSTEM

(75) Inventors: Yutaka Tahara, Kyoto (JP); Hirohito Mizumoto, Kyoto (JP); Shigenori Sawada, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 708 days.

(21) Appl. No.: 14/005,329

(22) PCT Filed: Jan. 30, 2012

(86) PCT No.: PCT/JP2012/051986
§ 371 (c)(1),
(2), (4) Date: Dec. 23, 2013

(87) PCT Pub. No.: WO2012/124392
PCT Pub. Date: Sep. 20, 2012

(65) Prior Publication Data
US 2014/0122631 A1    May 1, 2014

(30) Foreign Application Priority Data
Mar. 15, 2011   (JP) .................................. 2011-056389

(51) Int. Cl.
*G06F 15/16*     (2006.01)
*H04L 12/24*     (2006.01)
*H04L 29/12*     (2006.01)

(52) U.S. Cl.
CPC .......... *H04L 41/04* (2013.01); *H04L 41/0869* (2013.01); *H04L 41/12* (2013.01); *H04L 61/103* (2013.01); *H04L 61/2038* (2013.01)

(58) Field of Classification Search
CPC ............. H04L 12/40019; H04L 12/403; H04L 41/0866; H04L 41/12; H04L 12/2416;
(Continued)

(56) References Cited

U.S. PATENT DOCUMENTS 7,120,680 B1   10/2006 Higgins et al.
8,247,927 B2   8/2012 Togawa
(Continued)

FOREIGN PATENT DOCUMENTS

JP   2010-510741   4/2010
JP   2010-206252   9/2010
JP   2010-213068   9/2010

OTHER PUBLICATIONS

International Search Report from International Patent Appl. No. PCT/JP2012/051986, mail date is Apr. 17, 2012.
(Continued)

*Primary Examiner* — Dustin Nguyen
*Assistant Examiner* — Hao Nguyen
(74) *Attorney, Agent, or Firm* — Greenblum & Bernstein, P.L.C.

(57) ABSTRACT

A network system includes a master device (200), a plurality of slave devices; and a hub device including a plurality of ports on a downstream side. The master device (200) includes: a storage unit (204) in which setting information is stored, information on a device and topological information being set in the setting information; a real configuration information generating unit (202) that generates real configuration information including information on the device constituting an actual network system and topological information on the device; and a determination unit (203) that determines whether a destination of each device is correct by comparing the real configuration information to the setting information. The determination unit (203) determines that the destination of the slave device is correct, even if a position of the connected port is incorrect with respect to the slave device connected to the hub device.

13 Claims, 9 Drawing Sheets

(58) Field of Classification Search
CPC . H04L 12/2602; H04L 1/0061; H04L 1/0083; H04L 41/0853; H04L 69/40; H04L 43/50; H04L 41/04; H04L 41/145; H04L 43/0811; H04J 14/0227
USPC .............. 709/223, 224, 208; 398/9, 34; 455/67.13, 69
See application file for complete search history.

(56) References Cited

U.S. PATENT DOCUMENTS

| | | | |
|---|---|---|---|
| 8,531,942 B2 | 9/2013 | Buttner et al. | |
| 2002/0046271 A1* | 4/2002 | Huang | H04L 45/00 709/223 |
| 2003/0105881 A1 | 6/2003 | Symons et al. | |
| 2004/0018817 A1* | 1/2004 | Kanayama | H04W 52/0229 455/77 |
| 2004/0228290 A1* | 11/2004 | Graves | G06F 17/30067 370/257 |
| 2004/0264382 A1 | 12/2004 | Lackshminarasimha et al. | |
| 2006/0056401 A1* | 3/2006 | Bohm | G06F 13/4022 370/360 |
| 2007/0253642 A1* | 11/2007 | Berrill | G06F 17/30241 382/305 |
| 2009/0077455 A1* | 3/2009 | Mizutani | H04L 1/0061 714/807 |
| 2009/0235001 A1* | 9/2009 | Buttner | H04L 12/437 710/110 |
| 2009/0304381 A1* | 12/2009 | Muppidi | H04B 10/0773 398/34 |
| 2010/0074383 A1* | 3/2010 | Lee | H04J 3/0667 375/354 |
| 2010/0231054 A1 | 9/2010 | Togawa | |
| 2014/0047056 A1* | 2/2014 | Tahara | H04L 12/2416 709/208 |
| 2014/0082116 A1* | 3/2014 | Sasaki | H04L 41/12 709/208 |

OTHER PUBLICATIONS

Rehnman M et al., "Synchronization in a Force Measurement System Using EtherCAT", Emerging technologies and factory automation, 2008.
Extended European Search Report for European Patent Application No. 12 757 711.2-1853 dated Jan. 17, 2017.

* cited by examiner

| Device name | Port | Connection destination device name | Connection destination port |
|---|---|---|---|
| Master device 200 | OUT | Hub device 700 | IN |
| Hub device 700 | IN | Master device 200 | OUT |
| | OUT1 | Slave device 300a | IN |
| | OUT2 | | |
| | OUT3 | | |
| | OUT4 | | |
| | OUT5 | Slave device 300b | IN |
| | OUT6 | | |
| Slave device 300a | IN | Hub device 700 | OUT1 |
| | OUT | | |
| Slave device 300b | IN | Hub device 700 | OUT5 |
| | OUT | | |

(b)

| Connection sequence | Position address | Slave |
|---|---|---|
| 1 | 0000 | 710A |
| 2 | FFFF | 300a |
| 3 | FFFE | 710B |
| 4 | FFFD | 710C |
| 5 | FFFC | 300b |

| Device name | Port | Connection destination device name | Connection destination port |
|---|---|---|---|
| Master device 200 | OUT | Hub device 700 | IN |
| Hub device 700 | IN | Master device 200 | OUT |
| | OUT1 | | |
| | OUT2 | | |
| | OUT3 | | |
| | OUT4 | Slave device 300b | IN |
| | OUT5 | Slave device 300a | IN |
| | OUT6 | | |
| Slave device 300a | IN | Hub device 700 | OUT5 |
| | OUT | | |
| Slave device 300b | IN | Hub device 700 | OUT4 |
| | OUT | | |

(b)

| Connection sequence | Position address | Slave |
|---|---|---|
| 1 | 0000 | 710A |
| 2 | FFFF | 710B |
| 3 | FFFE | 300b |
| 4 | FFFD | 710C |
| 5 | FFFC | 300a |

NETWORK SYSTEM, MASTER DEVICE, AND METHOD FOR CONTROLLING NETWORK SYSTEM

TECHNICAL FIELD

The present invention relates to a network system including a hub device, a master device in the network system, and a method for controlling the network system.

BACKGROUND ART

In the field of FA (Factory Automation), control in which various kinds of devices take charge of parts of a work process is performed. In order to cooperatively operate various controllers, a remote I/O, and a production device, which are used in work in a given region such as a factory facility, an industrial network system also called a field network is constructed to connect these devices.

In many industrial network systems, production facilities are controlled while various slave devices that perform data collection and control of the production facilities installed in a factory and a master device that intensively controls a plurality of slave devices are connected through a communication bus.

The network including the master device and the slave devices may have various topologies such as an in-line shape, a ring shape, a tree shape and a star shape according to cooperation between the devices and a situation of wiring. For example, in the in-line topology, all the slave devices are included in one transmission path with the master device as a starting point. Assuming that the master device is located on an upstream side, an information signal transmitted from the upstream side passes sequentially through the slave devices connected in series to the transmission path, and the information signal returns to the master device after reaching the slave device located at a downstream end. In the ring-shape topology, the master device includes a port on the side on which the information signal is transmitted and a port on the side on which the information signal is received. The transmitted information signal is returned from the port on the reception side after passing continuously through the slave devices.

Thus, in the in-line topology or the ring-shape topology, the information signal passes through the one transmission path with no branch.

On the other hand, in the tree-shape or star-shape topology, the transmission path from the master device is branched. A hub device is disposed as a network device in a branching place. The hub device includes one port connected on the upstream side and a plurality of ports connected to the downstream slave devices. The hub device can be regarded as a kind of the slave device that takes care of the transmission path control of the network.

A technology called industrial Ethernet (registered trademark) to which an Ethernet technology is applied is being developed as an example of the industrial network aimed at the FA field. Industrial Ethernet is also called technical Ethernet or real-time Ethernet, and is the network system in which the Ethernet technology and device are introduced to an FA system in various layers. Various associations define and disclose an open standard as industrial Ethernet, and EtherCAT (registered trademark, Ethernet for Control Automation Technology) driven forward by ETG (EtherCAT Technology Group) is one of the open standards.

In an EtherCAT standard, the in-line connection and the branch in which the hub device is used can be combined, and various topologies are supported. In EtherCAT, the information signal (frame) is not transmitted from the master device to a specific destination, but the identical information signal goes around all the slave devices. Because the information signal includes control data of each slave device during control operation, the slave device reads a target portion of itself from the information signal and rewrites a content of the information signal as needed basis during the passage of the information signal through the slave device. Accordingly, because the information signal reaches the downstream end without remaining in one place of the network, the high-speed communication can be implemented without collision of data.

As described above, the information signal in EtherCAT moves in the network while following what is called a unicursal path. The characteristic is unchanged even in the topology including the branching place. That is, when the information signal transmitted from the master device reaches the hub device that is of the branching place, the information signal is transmitted to the slave device connected to one of the ports of the hub device. In the case where another slave device exists on the downstream side of the slave device, the information signal is sequentially delivered in the in-line manner, and the information signal is returned after reaching the downstream end. Then the information signal is transmitted to the slave device connected to another port of the hub device.

In designing the network system pursuant to the EtherCAT standard, as described above, it is necessary to make design with a consciousness of a connection sequence between the slave devices or which port of the hub device is to be connected to the slave device. A design support system is provided in order to facilitate the design work, when a user who does not have expert knowledge or an experience unlike an SE performs system design or assembly of a real machine. The design support system has a form like a management device connected to the master device. For example, the management device is a personal computer on which a setting tool that is of a setting information generating application is installed.

Patent Document 1 describes a communication system in which the master device and the slave device are connected to each other on a double conductive wire structure.

Patent Document 1: International Patent Publication No. 2010-510741

SUMMARY OF THE INVENTION

Problems to be Solved by the Invention

As described above, in the industrial network system, various topologies can be constructed according to an environment using the hub device. The hub device can branch the transmission path by including the plurality of downstream connection ports, and the hub device acts as a repeater that extends a network length in the case where a cable length is restricted. However, depending on the kind of the industrial network system, sometimes a problem different from that of usual Ethernet is generated due to a character of the standard. The problem will be described below.

In such a standard as Ethernet, there is no particular limitation to an arrangement sequence of the device in the network, and the device like the switching hub divides the frame in the device connected to any port in the branching place. This is because each device has a unique physical address, such as a MAC address, which is allocated irrespective of the position in the network.

On the other hand, for example, in the EtherCAT standard, the position of the device on the network based on the connection sequence has a meaning in the information transmission between the master device and the slave device. This is because the slave device does not have the absolute address such as the MAC address, but the master device first identifies each slave device based on the position in the network in starting the communication setting. As described above, the information signal transmitted from the master device goes around all the slave devices. At the starting stage of the communication setting, information indicating the sequence of the information signal transmitted from the master device is used to identify the slave device. The communication that is conducted while the slave device is identified by this method is called communication in a position address mode. When the master device and each slave device can conduct communication with each other in the position address mode, information setting the slave device is transmitted from the master device to the slave device. Through the communication, the master device sets information indicating that a range of a logical address in the information signal should be used by each slave device during the control to the slave device. The communication in which the logical address is used is called communication in a logical address mode. Alternatively, a unique address called an alias is set to each slave device, the master device collects the alias of each slave device through the communication in the position address mode, the alias of the slave device is set as a node address of the slave device, and the communication may be conducted using the node address. This communication is called communication in a node address mode. The node address is set in advance of the setting of the logical address, and the logical address may be set through the communication in the node address mode.

A slave circuit (such as an ASIC and an FPGA, which act as the slave) incorporated in the slave device of EtherCAT generally includes four ports, one of the four ports is the port connected onto the upstream side, and the three ports can be connected on the downstream side. In the case where the hub device is constructed using the one slave circuit, because the sequence in which the information signal goes around the ports is decided, the sequence in which the information signal goes around another slave device connected to the port depends on which port is connected to another slave device. In the case where the hub device of EtherCAT includes at least four downstream ports, it is necessary to internally use a plurality of slave circuits. In this case, because the sequence in which the information signal goes around at least the four downstream ports depends on the internal configuration of the hub device, the sequence in which the information signal goes around another slave device connected to the port depends on which port is connected to another slave device.

It is assumed that the user assigns the two ports in the one hub device to connect the slave devices to the ports. In the setting information, it is assumed that a slave device A is connected to an upstream port while a slave device B is connected to a downstream port. At this point, in the case where the user mistakenly connects the slave device B to the upstream port while connecting the slave device A to the downstream port, the information signal is transmitted first to the slave device B, although the information signal should be transmitted first to the slave device A. As a result, the slave device at the other end of the communication is wrong when the master device conducts communication in the position address mode on the assumption that the slave device A and the slave device B are connected in the sequence defined in the setting information. When the master device sets the logical address to the slave device while the slave device at the other end of the communication is wrong, the false communication is conducted during the control operation.

In order to prevent the situation in which the FA line does not operate due to the wrong port to which the slave device is connected or the wrong device connection sequence, there is proposed a method for matching the setting information with the actual wiring connection during start-up of the network system. The matching processing is defined in many standards of the industrial networks including EtherCAT, and the user is encouraged to perform the wiring or the connection again in the case where a difference is found as a result of the matching.

The matching processing is necessary to normally operate the network as expected. At the same time, possibly the user takes a trouble to have a bothersome feeling. That is, the user is not always acquainted with the network standard or the internal configuration of the hub device. In the case where the user views the hub device including the plurality of ports, similarly to a switching hub in general Ethernet, possibly the user inserts the cable to be connected to the slave device in any port without being conscious of the go-around sequence of the information signal according to the port.

In the network system in which the matching processing is performed, the user is required to perform the wiring or connection again, and therefore the user spends the time on work to perform the wiring or connection again.

The present invention has been devised to solve the above problems, and an object of the present invention is to provide a technology for not making the user conscious of the difference of the port when the slave device is connected to the hub device during the construction of the network system.

Means for Solving the Problem

In order to achieve the above object, the present invention has the following configuration. That is, a network system including: a master device; a plurality of slave devices; and a hub device including a port connected to an upstream device and a plurality of ports connected to a downstream device, the network system is characterized in that the master device includes: a storage unit in which setting information is stored, information on a device constituting the network system and topological information on the device being set in the setting information; a real configuration information generating unit configured to generate real configuration information based on information collected from each device in an actual network system, the real configuration information including information on the device constituting the actual network system and topological information on the device; and a determination unit configured to determine whether a destination of each device in the actual network system is correct by comparing the real configuration information to the setting information, and the determination unit determines that the destination of the slave device is correct, even if a position of the port to which the slave device is connected is incorrect, when the real configuration information is identical to the setting information in the hub device to which the slave device connected to a downstream port of the hub device is connected.

According to the network system, when the hub device to which the slave device is connected is correct, the recognition of the normal connection can be achieved even if the destination port is incorrect. Therefore, the user who performs the wiring connection of the network device can work without being conscious of which port of the hub device is connected to the slave device, and usability can be improved in the system construction.

The present invention can be regarded as follows. That is, a master device in a network system including: the master device; a plurality of slave devices; and a hub device including a port connected to an upstream device and a plurality of ports connected to a downstream device, the master device including: a storage unit in which setting information is stored, information on a device constituting the network system and topological information on the device being set in the setting information; a real configuration information generating unit configured to generate real configuration information based on information collected from each device in an actual network system, the real configuration information including information on the device constituting the actual network system and topological information on the device; and a determination unit configured to determine whether a destination of each device in the actual network system is correct by comparing the real configuration information to the setting information, the master device is characterized in that the determination unit determines that the destination of the slave device is correct, even if a position of the port to which the slave device is connected is incorrect, when the real configuration information is identical to the setting information in the hub device to which the slave device connected to a downstream port of the hub device is connected.

The present invention can be regarded as follows. That is, a method for controlling a network system including: a master device; a plurality of slave devices; and a hub device including a port connected to an upstream device and a plurality of ports connected to a downstream device, the method for controlling the network system including: a storage step in which the master device stores setting information therein, information on a device constituting the network system and topological information on the device being set in the setting information; a real configuration information generating step in which the master device generates real configuration information based on information collected from each device in an actual network system, the real configuration information including information on the device constituting the actual network system and topological information on the device; and a determination step in which the master device determines whether a destination of each device in the actual network system is correct by comparing the real configuration information to the setting information, the method for controlling the network system is characterized in that, in the determination step, a determination that the destination of the slave device is correct is made, even if a position of the port to which the slave device is connected is incorrect, when the real configuration information is identical to the setting information in the hub device to which the slave device connected to a downstream port of the hub device is connected.

The object of the present invention can also be achieved by the method for controlling the network system.

The present invention can be regarded as follows. That is, a network system including: a master device; a plurality of slave devices; and a hub device including a port connected to an upstream device and a plurality of ports connected to a downstream device, the network system is characterized in that the master device includes: a storage unit in which setting information is stored, information on a device constituting the network system and topological information on the device being set in the setting information; a real configuration information generating unit configured to generate real configuration information based on information collected from each device in an actual network system, the real configuration information including information on the device constituting the actual network system and topological information on the device; a determination unit configured to determine that the real configuration information is identical to the setting information in the hub device to which the slave device connected to a downstream port of the hub device is connected; and an address correlating unit configured to correlate an address of an information signal based on a position of the slave device in the setting information with an address of an information signal based on a position of the slave device in the real configuration information with respect to the slave device that is determined to be applicable by the determination unit.

According to the network system, when the hub device to which the slave device is connected is matched with the setting information, the communication can correctly be conducted based on the address of the position of the slave device even if the destination port is different from the setting information. The address correlation may be performed irrespective of difference in the destination port of the slave device.

The present invention can be regarded as follows. That is, a master device in a network system including: the master device; a plurality of slave devices; and a hub device including a port connected to an upstream device and a plurality of ports connected to a downstream device, the master device is characterized by including: a storage unit in which setting information is stored, information on a device constituting the network system and topological information on the device being set in the setting information; a real configuration information generating unit configured to generate real configuration information based on information collected from each device in an actual network system, the real configuration information including information on the device constituting the actual network system and topological information on the device; a determination unit configured to determine that the real configuration information is identical to the setting information in the hub device to which the slave device connected to a downstream port of the hub device is connected; and an address correlating unit configured to correlate an address of an information signal based on a position of the slave device in the setting information with an address of an information signal based on a position of the slave device in the real configuration information with respect to the slave device that is determined to be applicable by the determination unit.

Effect of the Invention

Accordingly, the present invention can provide the technology for not making the user conscious of the difference of the destination port when the slave device is connected to the hub device during the construction of the network system.

BRIEF DESCRIPTION OF THE DRAWINGS

FIG. 5 is a view illustrating industrial network system setting information generated by a user.

FIG. 6 is a view illustrating an industrial network system topology collected by the master device.

MODE FOR CARRYING OUT THE INVENTION

Hereinafter, a preferred embodiment of the present invention will be described with reference to the drawings. Although a system construction method pursuant to a standard of EtherCAT (registered trademark) is described in the following Examples, a target of the present invention is not limited to Examples. The application target of the present invention is aimed at an industrial network system, in which processing of matching setting information and real configuration information with each other is performed during the start-up of a network with respect to information on a device constituting a network system and topological information thereof, and the network, in which a hub can be used and which is evaluated as a topology effectively different from the setting information in the case where the network is connected to a port different from that of the hub assigned by the setting information.

(Constituent Element of Industrial Network System)

Figure 7:
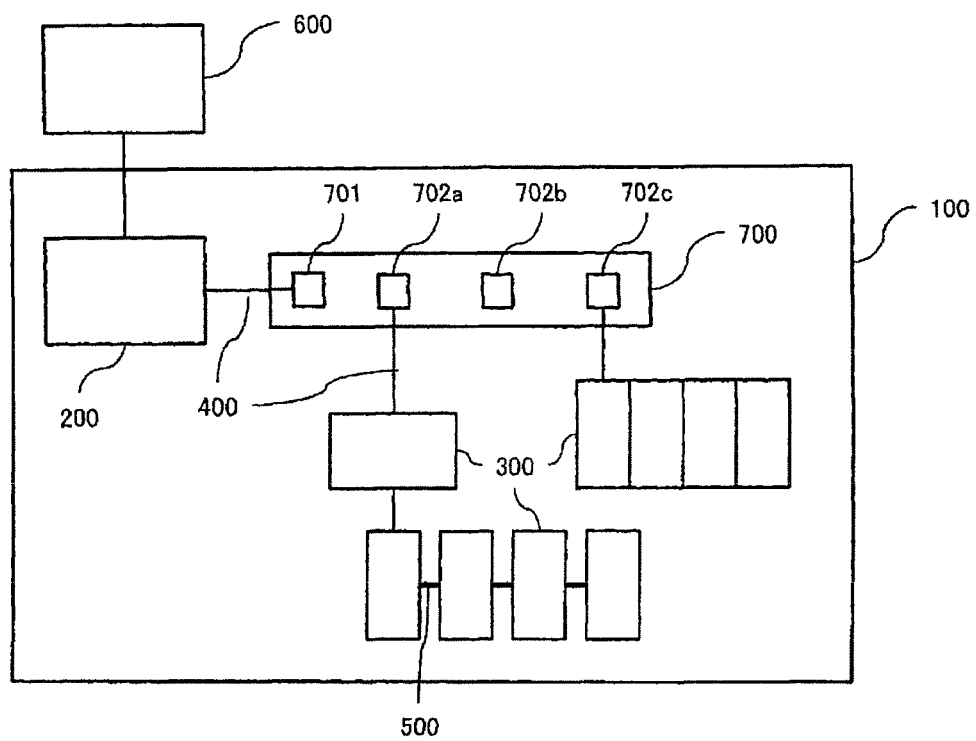
FIG. 7 is a view illustrating a configuration of the industrial network system according to the present invention.

FIG. 7 is a view illustrating a configuration example of an industrial network. In FIG. 7, an industrial network 100 is formed by directly or indirectly connecting a master device 200 (PLC (Programmable Logic Controller)) to a plurality of slave devices 300 through cables 400 or an I/O unit 500 included in each device and a hub device 700. Examples of the slave device 300 include a power supply unit, a motor unit, a counter unit, an image unit, a communication unit, an I/O unit, and the like. Sometimes a management device 600 is connected to the master device 200 in order that a user sets operation of the master device 200, displays an operating state of the industrial network 100, and designs the network system. The management device 600 is constructed by a personal computer on which a setting tool is installed, and the like. Assuming that the master device is an upstream side, the hub device 700 includes one port 701 connected onto the upstream side, and a plurality of ports 702a to 702c connected onto a downstream side. It is also said that the hub device is a kind of the slave device.

The industrial network 100 according to the present examples is a network pursuant to an EtherCAT standard. For example, the industrial network 100 is installed in a factory and used as an FA system. The master device 200 transmits an information signal including control data through the network according to a program or an operation. The slave device 300 performs a device operation based on the received information signal, rewrite of the received information signal, and a return processing (processing of transmitting the information signal onto the downstream side) in response to a request included in the information signal from the master device. The master device controls a content or timing of the operation, and all the slave devices take charge of parts of work in conjunction with one another, thereby achieving production performed in the factory using the industrial network 100.

The cable 400 used in the standard of general Ethernet (registered trademark) can also be used in EtherCAT.

The user can form a desired topology by setting a connection sequence or a branch using the cable and the EtherCAT hub device, when the constituent elements are connected to each other.

(Kind of Address of Slave Circuit)

A position address, a node address, and a logical address, which are three kinds of addresses of a slave circuit (such as an ASIC and an FPGA, which act as a slave) used in the present embodiment, will be described.

The position address is the address that is decided by a physical connection sequence of the slave circuit when viewed from the master device 200. However, the position address is the address that is managed and used only on the side of the master device 200, but a value of the position address is not set to each slave circuit. The communication in which the position address is used is conducted as follows. A two-byte position address area, which is provided at a predetermined position in the information signal (serial communication frame) transmitted from the master device 200 during the communication in which the position address is used, is used to specify the destination slave circuit. When transmitting the information signal to the nth slave circuit (for example, the second slave circuit 7108 in FIG. 3) from the master device 200, the master device 200 stores a value of 1−n (FFFF (hexadecimal number) in the case of n=2) in the position address area. Each slave circuit checks the value of the position address area of the information signal. The slave circuit determines the information signal is sent to itself when the position address area has the value of 0. The slave circuit reads data from the information signal and writes data in the information signal, updates the value of the position address area by adding 1 to the original value, and transfers the information signal to the next slave circuit. When the position address area of the information signal has the value except 0, each slave circuit updates the value of the position address area by adding 1 to the original value, and transfers the information signal to the next slave circuit. Thus, in the master device 200, the first slave circuit can be treated while taken as the position address of 0, the second slave circuit can be treated while taken as the position address of FFFF (hexadecimal number), and the third slave circuit can be treated while taken as the position address of FFFE (hexadecimal number). However, these values are not set to the slave circuits as described above. Thus, in the case where the address is not set to each slave circuit, the use of the position address can conduct communication while the master device 200 specifies the connection sequence of the slave circuit at the other end.

The node address is the address that is allocated to each slave circuit irrespective of the connection sequence of the slave circuit from the master device 200. Each slave circuit has an address value called an alias in an internal nonvolatile memory. The user can set the alias value. The master device 200 reads the alias value of each slave circuit, and sets the value identical to the alias value of the slave circuit as the node address of the slave circuit to the slave circuit in principle. The communication is conducted using the position address in order to perform the read of the alias value and the setting of the node address. However, in the case where the overlapping alias value exists in the network around which the one information signal goes, the master device 200 adjusts the value of the node address to a value different from the alias value such that the node addresses do not overlap each other. Once the node address is provided to the slave circuit, the node address is not changed even if the connection sequence of the slave circuit is changed. In the case where identification information corresponding to a difference of a serial number of an identical model cannot be acquired although a device name corresponding to the model can be acquired through the communication in the position address mode, individual pieces of the identical model can be identified using the node address. Accordingly, the node address is used in event-type message communication, such as communication related to monitoring or management of the slave device, in which the specific information signal is transmitted to the specific slave circuit.

The logical address is the address indicating a position in a logical address space formed in the one information signal (serial communication frame). In order to perform a control operation (for example, drive of a servo motor) that is of the purpose of the control system, output data is cyclically transmitted from the master device 200 to each slave circuit, and input data is cyclically transmitted from each slave circuit to the master device 200. This control cyclic communication is conducted using the logical address space in the information signal. That is, in the information signal, the position of each piece of data to be transmitted and received through the control cyclic communication is specified by the logical address. While the information signal passes through each slave circuit, the slave circuit reads the output data from the logical address portion for the output data sent to itself in the information signal, and writes the input data in the logical address portion for the input data of itself in the information signal. When the one information signal thus goes around the network, the master device 200 can transmit the output data to each slave circuit, and each slave circuit can transmit the input data to the master device 200. The master device 200 conducts communication with each slave circuit using the node address or the position address in order to set the logical address used by the slave circuit.

(Internal Configuration of Hub Device)

The hub device used in EtherCAT will be described in detail with reference to FIG. 2. FIG. 2(a) is a view illustrating a state when the hub device is viewed from the outside. In FIG. 2(a), the hub device 700 includes one IN port and six OUT ports OUT1 to OUT6. During the construction of the network, the user makes design while assigning the number of the OUT port of the hub device. The cable is inserted in the IN port from the master device side according to information set by a design support system, and the cable to the slave device is inserted in the OUT port.

FIG. 2(b) schematically illustrates an internal configuration of the hub device. The hub device 700 includes three slave circuits 710A, 710B, and 710C in order to cope with a restriction that the one slave circuit has only the four ports (one of the four ports is connected to the upstream side). A port 0 of each slave circuit is an upstream port. The signal inputted to the port 0 of the slave circuit is outputted from a port 3. The signal inputted to the port 3 is outputted from a port 1. The signal inputted from the port 1 is outputted from the port 2. The signal inputted to the port 2 is outputted from the port 0.

In the path from the port 0 to the port 3, the slave circuit reads the information from the signal and writes the information in the signal. The processing in which the determination that the information signal is sent to itself is made when the position address area of the information signal has the value of 0 and the processing of incrementing and updating the value of the position address area are also performed in the path from the port 0 to the port 3. These pieces of processing are not performed in other paths, but the information signal is transferred.

In the case where another slave circuit is not connected to one of the ports, each slave circuit does not output the signal from the port, but transfers the signal to the next port. For example, unless another slave circuit (slave device) is connected to the port 3, the signal inputted to the port 0 is transferred to the port 1 after being processed in the slave circuit. On the other hand, in the case where another slave circuit (slave device) is connected to the port 3, the signal inputted to the port 0 is transferred to another slave circuit or device after being processed in another slave circuit or device. Then, the signal is transferred to the port 1 when the signal is inputted from another slave circuit (slave device) to the port 3.

The upstream port of the slave circuit 710A is connected to the downstream port of the master device or another slave device. The upstream port of the slave circuit 710A is the IN port of the whole hub device. The slave circuits 710B and 710C are connected in series with the slave circuit 710A. Each of the slave circuits 710A to 710C includes the two downstream ports used as the OUT port of the hub device 700.

A number of the OUT port and a transfer sequence of the information signal in the hub device will be described below. At this point, it is assumed that the OUT ports OUT1 to OUT6 are designed to be sequentially arranged in the path.

Figure 2:
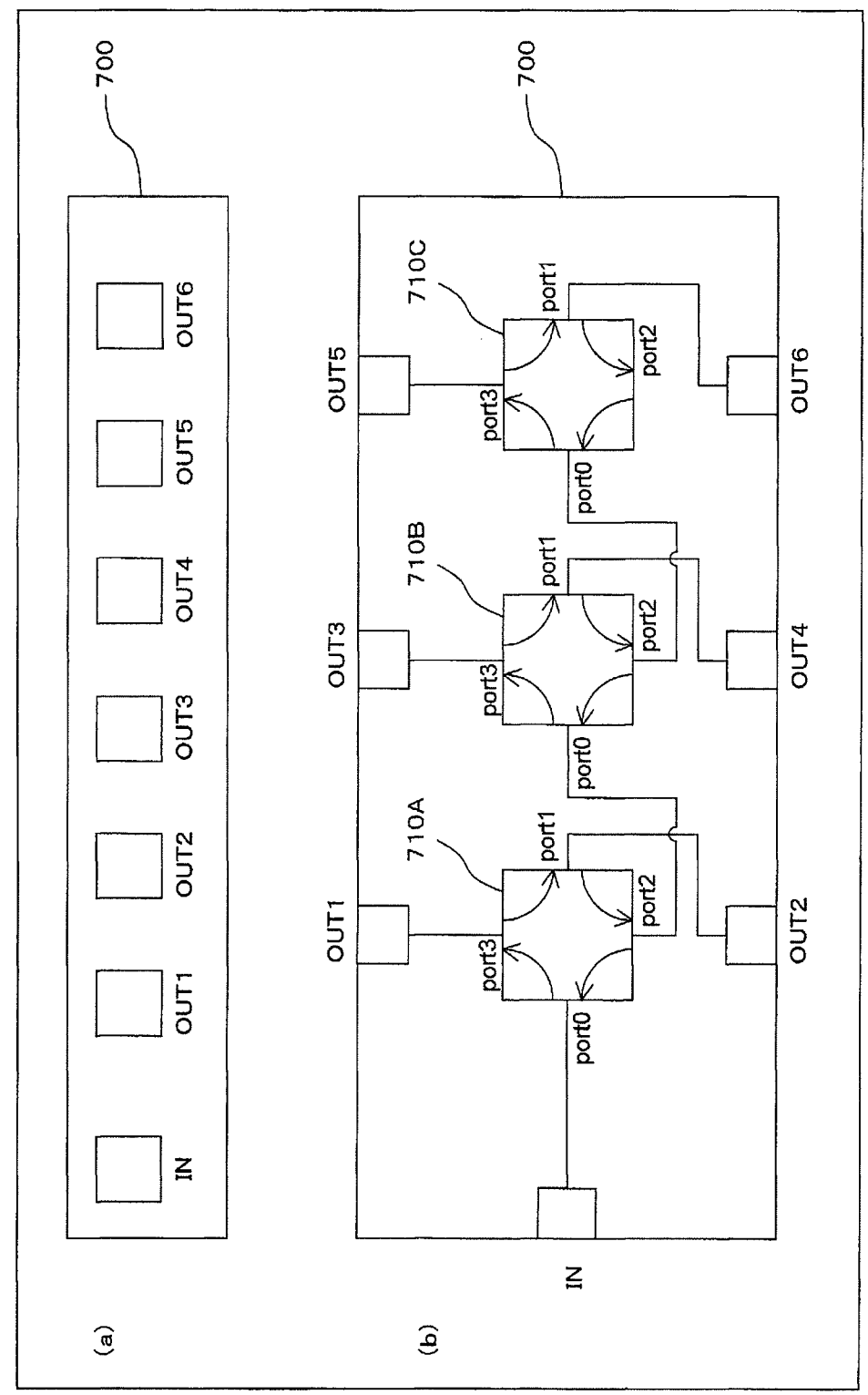
FIG. 2 is a view illustrating a hub device in an industrial network system according to the present invention.

FIG. 3(a) illustrates the state in which the user correctly connects slave devices 300a and 300b to the hub device in FIG. 2 according to the setting information. The slave device 300a is connected to the OUT port OUT1, namely, the port 3 of the slave circuit 710A. The slave device 300b is connected to the OUT port OUT5, namely, the port 3 of the slave circuit 710C. At this point, it is assumed that the information signal is transmitted from the master device 200 (encircled number 1). The slave circuit 710A transfers the information signal to the slave device 300a (encircled number 2). The information signal that returns through the processing performed by the slave device 300a is transferred to the slave device 300b through the slave circuits 710B and 710C (encircled number 3). Because the branching destination does not exist in FIG. 3(a), the information signal is sent back to the master device.

Although the detailed setting information is described later, FIG. 5 illustrates the setting information corresponding to FIG. 3(a).

FIG. 3(b) illustrates the state in which the network connection different from that of the setting information is performed. The slave device 300a is connected to the OUT port OUT5, namely, the port 3 of the slave circuit 710C. The slave device 300b is connected to the OUT port OUT4, namely, the port 1 of the slave circuit 710B. At this point, the information signal (encircled number 1) transmitted from the master device 200 is transferred from the slave circuit 710B to the slave device 300b through the slave circuit 710A (encircled number 2). Then the information signal returned to the slave circuit 710B reaches the slave device 300a through the slave circuit 710C (encircled number 3).

In FIG. 3(a), when the communication is conducted using the position address, the connection sequence (the go-around sequence of the information signal) of the slave circuit and devices is as follows: (1) the slave circuit 710A, (2) the slave device 300a (it is assumed that the one slave circuit exists therein), (3) the slave circuit 710B (through the slave circuit 710A), (4) the slave circuit 710C, and (5) the slave device 300b (it is assumed that the one slave circuit exists therein.

On the other hand, in FIG. 3(b), go-around sequence of the information signal is as follows: (1) the slave circuit 710A, (2) the slave circuit 710B, (3) the slave device 300b, (4) the slave circuit 710C (through the slave circuit 710B), and (5) the slave device 300a.

Accordingly, in the case where the communication is conducted using the position address on the assumption that the actual connection sequence is the connection sequence in FIG. 3(a) while the setting information possessed by the master device 200 indicates the connection sequence in FIG. 3(a), because the other end of the communication is wrong when the actual connection sequence is the connection sequence in FIG. 3(b), the communication cannot correctly be conducted.

(Processing During Start-Up of Network)

Figure 3:
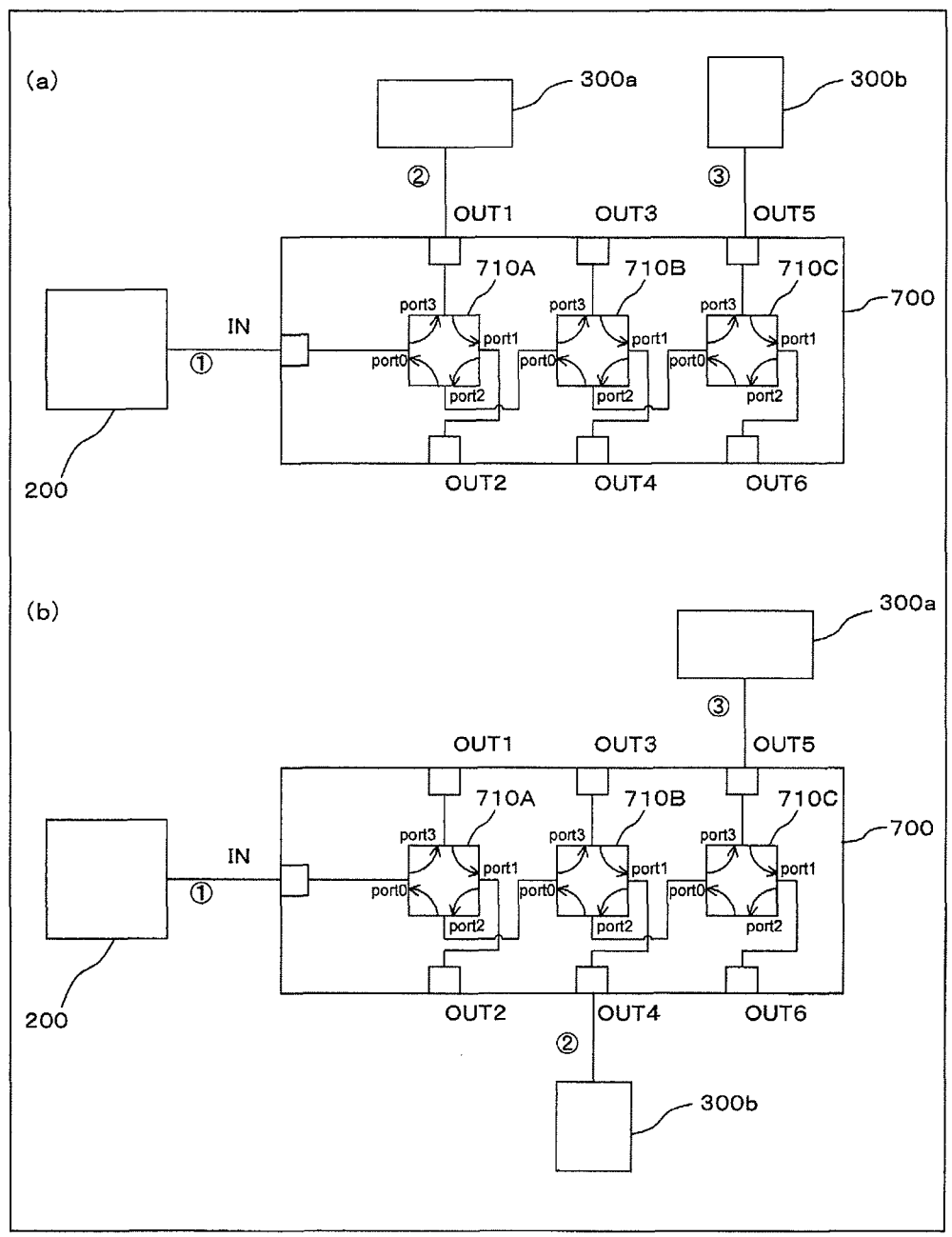
FIG. 3 is a view illustrating a state in which a slave device is connected to the hub device.
Figure 4:
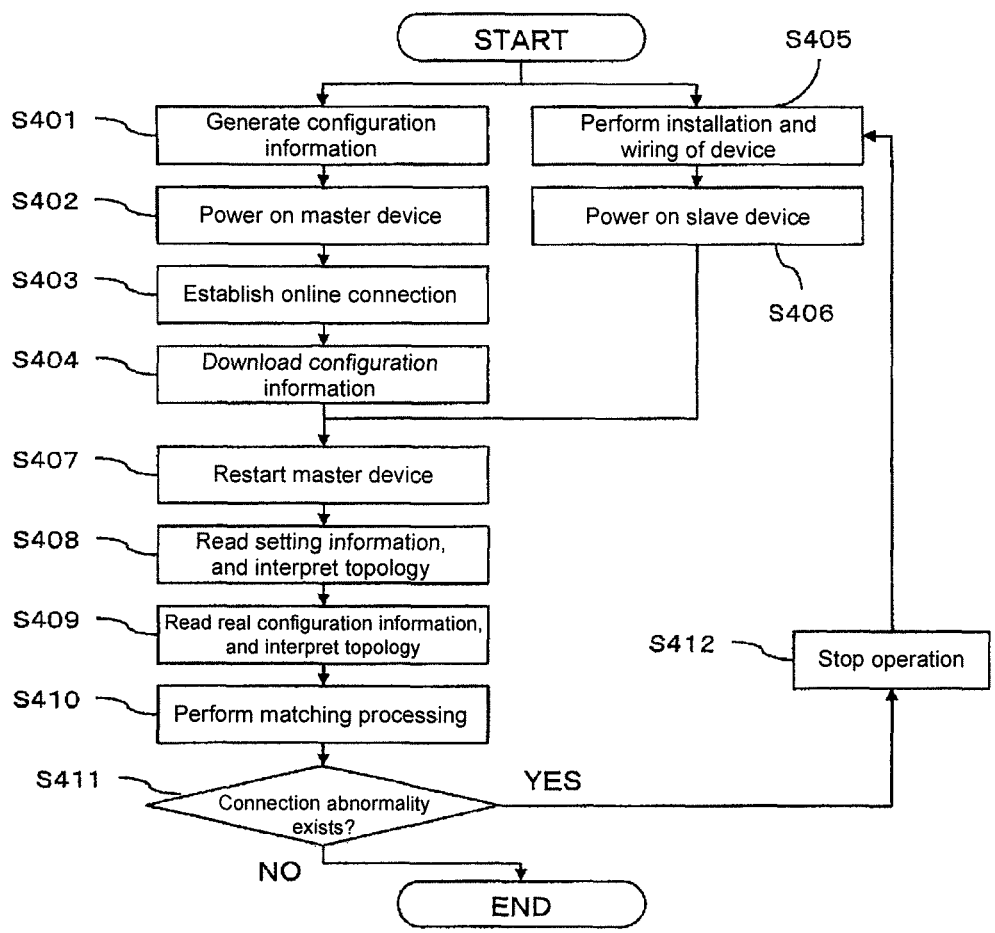
FIG. 4 is a flowchart illustrating processing during start-up of a network in a fixed topology.

The processing during the start-up of the network system, which is performed when the actual wiring connection differs from that of the setting of the user as illustrated in FIG. 3, will be described below as the assumption of Examples of the present invention. FIG. 4 is a flowchart illustrating an initial setting of the system and the connection, wiring, and start-up of the device.

In step S401, the user defines the network configuration using the setting tool. The setting tool is provided as an application operating on an OS of the personal computer, and the user assembles a part corresponding to each device while checking the topology on a GUI, and the user can generate the setting information on the network. As to the setting of the hub device, each port is displayed on a screen, and the slave device to be connected can be assigned for each port.

The setting information, which is generated by the user with the view of the configuration in FIG. 3(a), can be expressed in a table form in FIG. 5(a). The setting information is stored in a memory in an XML file format, which is described according to a predetermined tag, for example, from the viewpoint of the inside of the application. In the table, the destination device name and the destination port are indicated in each port for each device.

An item necessary to help understanding of flow processing is indicated in FIG. 5. However, actually various items can be included in FIG. 5 besides such an item. Examples of the items include a vender, a model number, and a production number of each device, information indicating whether each port is closed or opened, and the node address of each device.

The master device 200 is powered on in step S402, and connected online to the network in step S403. An XML file in which the setting information (configuration information) is described is downloaded on the started-up master device 200 in step S404. That is, using the setting tool, the setting information stored in the personal computer is transferred to the master device 200. Thus, the topology is stored in the master device 200 according to the setting information generated by the user.

On the other hand, the installation and wiring of the slave device are performed in step S405, and the slave device is powered on in step S406. The user is required to originally make consideration such that each device is connected as the wiring is defined using the setting tool. However, the connection is performed without consciousness of the number of the OUT port of the hub device like usual Ethernet, as described above, the problem is generated during the communication in which the position address is used.

After the connection wiring is completed on the side of the master device 200 and the slave device side through steps S401 to S406, the master device 200 is restarted in step S407, and the restarted master device 200 recognizes the setting information (such as the downloaded XML file) in step S408. The master device 200 interprets the set topology based on the setting information. Specifically, as illustrated in FIG. 5(b), the connection sequences and position addresses of the slave circuit and slave device are specified based on the setting information in FIG. 5(a).

In step S409, the master device 200 conducts communication with the slave device connected to the network to collect and store the information on the slave device. At this point an access is performed using the position address. Assuming that the actual wiring is illustrated in FIG. 3(b), the information specifying the actual slave circuit and slave device corresponding to each position address (that is, the connection sequence) are obtained as illustrated in FIG. 6(b). FIG. 6(a) illustrates a result of the interpretation of the information in FIG. 6(b). The information specifying the port of the slave circuit to which the slave device is not connected is also used in order to perform the interpretation. Hereinafter, the configuration information acquired from the wired actual device is referred to as real configuration information with respect to the setting information on the setting tool.

In step S410, the master device compares the setting information to the real configuration information to check whether the setting information is matched with the real configuration information. The check is performed in not only the level of the destination device name but also the level of the destination port. When a difference between the setting information and the real configuration information is discovered in one of the level of the destination device name and the level of the destination port (YES in step S411), the determination that a connection abnormality is generated is made to stop the operation of the device (step S412). In order to inform the user of the abnormality generation, a notification is made using screen display on the personal computer, sound, or lighting of an LED.

The user notified of the abnormality checks the notification content and the setting information to correctly perform the installation and wiring of the device again (step S405). The slave device and the master device are restarted to resume the operations of the devices in the network (S406 to S408). When the connection abnormality is not discovered as a result of the follow-up matching processing between the real configuration information and the setting information (NO in S411), the initial setting processing is ended to transition to a next phase.

The situation in which the connection relationship between the port of the hub device and the slave device differs from that of the setting information or the situation in which the connection sequence of the slave device differs from that of the setting information can be prevented by performing the wiring and initial setting of the industrial network are performed through the procedure of the flow in FIG. 4. As a result, the system can be operated in the topology as the user intends.

In the present description, the mode in which the notification is made to the user to wait for correction in the case where setting information differs from the real configuration information in the topology is referred to as a fixed topology because the destination port or the connection sequence of the slave device is fixed. In the definition of the fixed topology, "setting information" means the initial setting information at the initial setting stage of the network, and means the setting information (including the real configuration information regarded as the updated setting information before the slave device is changed), which is updated as needed basis so as to be matched with the topology of the pre-change real configuration information, at the slave device changing stage.

While the network can be started up according to the setting through the matching processing in the fixed topology, the user is required to be conscious of the number of OUT port of the hub device during the wiring, and such a trouble that the wiring connection is performed again is generated when the port to which the slave device is connected is wrong. That is, the pieces of processing in steps S405 to S410 in the flowchart are repeatedly performed every time a mistake of the wiring connection is detected.

EXAMPLE 1

A method for implementing the network system, which solves the trouble of the user when the slave device is falsely connected to the port of the hub device in the fixed topology, by the function of the master device will be described in Example 1.
(Device Configuration)

Figure 1:
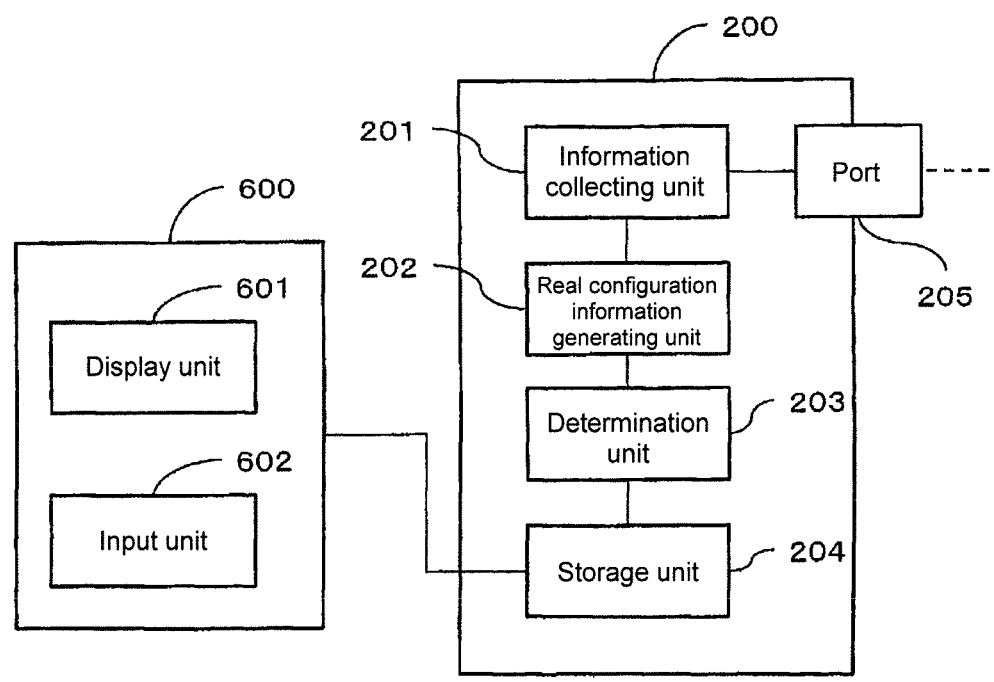
FIG. 1 is a view illustrating a configuration of a master device and a management device according to the present invention.

FIG. 1 is a block diagram illustrating configurations of a master device and a management device of Example 1. A management device 600 includes a display unit 601 that displays the topology when the user performs the setting and an input unit 602 through which the user performs the setting. In the case where the personal computer is used as the management device 600, the display unit 601 is a display device. The setting tool is provided as the application. The GUI of the setting tool is displayed as a window on the screen of the display device, and the user generates the setting information through the input unit 602 including a keyboard and a mouse.

A master device 200 includes an information collecting unit 201, a real configuration information generating unit 202, a determination unit 203, a storage unit 204, and a port 205. The information collecting unit 201 conducts communication with the slave device, which is connected to the downstream side through the port, to collect the information. The real configuration information generating unit 202 interprets the present topology based on the information collected by the information collecting unit 201, and converts the topology into the form in which the topology can be compared to that of the setting information. The determination unit 203 compares the setting information inputted from the setting tool of the management device to the real configuration information to determine whether different portion exists. The storage unit 204 conducts communication with the management device to acquire and store the setting information. The port 205 transmits the information signal from the master device to the downstream slave device, and receives the information signal that returns from the slave device. Different ports may be used as the port 205 during the transmission and the reception of the information signal.

Each of the management device 600 and the master device 200 includes a CPU (not illustrated) to executes a program, which allows the implementation of the function of each block.
(Determination Condition)

One of the features of Example 1 is that the determination unit 203 makes the determination on a determination condition different from that of the fixed topology. In the fixed topology, the determination unit determines that the slave device is correctly connected, only when the setting information is identical to the real configuration information in the name (destination device name) of the hub device to which the slave device is connected while the setting information is identical to the real configuration information in the port (destination port) of the hub device.

On the other hand, a mode, in which the determination that the slave device is correctly connected is made even if the setting information is different from the real configuration information in the port of the hub device when the setting information is identical to the real configuration information in the name (destination device name) of the hub device to which the slave device is connected, is provided in Example 1. Hereinafter, the mode is referred to as a free topology. The fixed topology corresponds to the second mode of the present invention, and the free topology corresponds to the first mode of the present invention.
(Processing Flow)

A processing flow in which the difference between the setting information and the actual wiring is permitted is used in the case where the determination is made in the free topology. The processing will be described with reference to a flowchart in FIG. 8. A point different from the fixed topology in FIG. 4 is mainly described.

In steps S401 to S409, similarly to the fixed topology, the setting information is generated using the setting tool, the installation and wiring of each device are performed, the real configuration information is read, and the topology is interpreted.

In step S801, the determination unit compares the setting information to the real configuration information based on the determination condition in the free topology. For example, it is assumed that the setting information is described in FIG. 5 while the real configuration information is described in FIG. 6. For the slave device 300a, although the setting information is different from the real configuration information in the connected port, the setting information is matched with the real configuration information in that the connected device name is the hub device 700.

In step S802, the determination unit determines whether the connection abnormality is generated in the device name level of the hub device to which the slave device is connected (the difference between the setting information and the real configuration information in the device name level). In the comparison of FIGS. 5 and 6, because the setting information is matched with the real configuration information in the device name (hub device 700) of the hub device to which the slave device 300a is connected, the determination unit 203 determines that the slave device 300a is normally connected. For the slave device 300b, similarly the determination of the normal connection is made in the free topology while the determination of the abnormal connection is made in the fixed topology. When the difference between the setting information and the real configuration information exists in the device name level (YES in S802), the operation is stopped (S412), and the user is required to check the wiring connection (S405 and S406). The notification to the user can be made by any method such as the display on the screen, the sound, and the lighting of a lamp.

On the other hand, in the case where the difference between the setting information and the real configuration information exists in the port level while the difference between the setting information and the real configuration information does not exist in the device name level (NO in S802), the determination of the normal connection is made in Example 1, the setting work can be performed for the purpose of the actual operation. In step S803, the master device correlates the position address included in the setting information with the actual position address with respect to each slave device specified by the device name. The CPU and the program, which are used in the processing in step S803, constitute the address correlating unit. Based on the address correlation, the master device converts the position address included in the setting information on the slave device that is of the communication destination into the actual position address. The master device conducts communication with the slave device in the position address mode using the converted position address. The master device sets the node address to the slave device through the communication in the position address mode.

When the determination that the real configuration information is identical to the setting information in the hub device to which the slave device is connected is made in Step S802, the flow may go to step S803 without determining whether the real configuration information is different from the setting information in the port to which the slave device is connected, namely, without determining whether the destination port of the slave device is incorrect. In this case, the address correlation is performed to the slave device in step S803 even if the real configuration information is identical to the setting information in the port to which the slave device is connected. However, the communication can normally be conducted.

When the difference of the connection port is permitted in the free topology, the user may be notified of the permission and the actual connection relationship, or the setting information updated according to the actual connection relationship may be transferred to the management device 600. Therefore, the user acquires the connection information matched with the actual connection relationship up to the port level, so that the user can be prevented from being confused at the discovery of the difference between the setting information and the actual connection relationship during the maintenance work.

Like Example 1, the determination unit makes the determination in the matching level in which the free topology is permitted, which allows the user not to be conscious of the difference of the port of the hub device at the initial setting and wiring connection stages. As a result, usability can be improved during the construction of the industrial network system such as EtherCAT.

EXAMPLE 2

The free topology effectively facilitates the configuration of the network. At the same time, however, when the initial setting and the start-up processing are ended to maintain the free topology even after the actual system operation is started, possibly a problem is generated during a breakdown of the slave device or the change of the slave device due to upgrade. A method for preventing the problem will be described in Example 2.

Figure 8:
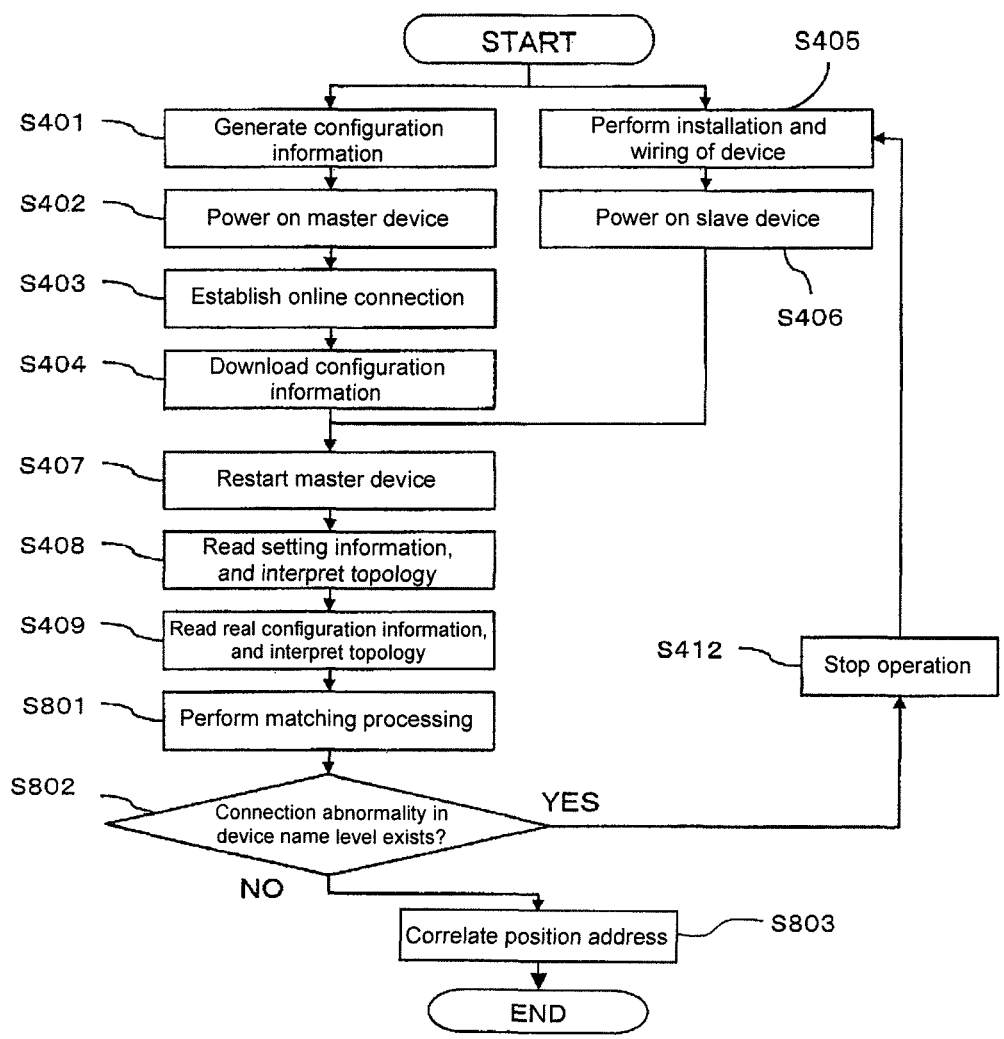
FIG. 8 is a flowchart illustrating processing of Example 1.

The initial setting is completed according to the processing flow in FIG. 8, and the actual operation is started in the topology in which the user performs the wiring connection. For example, it is assumed that the slave device 300a connected to the OUT port OUT5 of the hub device needs to be changed due to the breakdown after the operation is performed for a while. At this point, possibly the user connects the slave device to the port different from the OUT port OUT5 without being conscious of the number of the OUT port OUT5 of the hub device. Even if that is the case, when the post-change slave device takes over the setting of the pre-change slave device including the setting of the logical address, the destination is not mistaken in order to perform the control during the communication in the logical address mode. However, receiving timing is delicately changed in the slave device by the change of the go-around sequence of the information signal, which possibly has an influence on the control. From the viewpoint of the maintenance work, a risk of generating a trouble is lessened, when the wiring of the system is not changed once the system operates.

Figure 9:
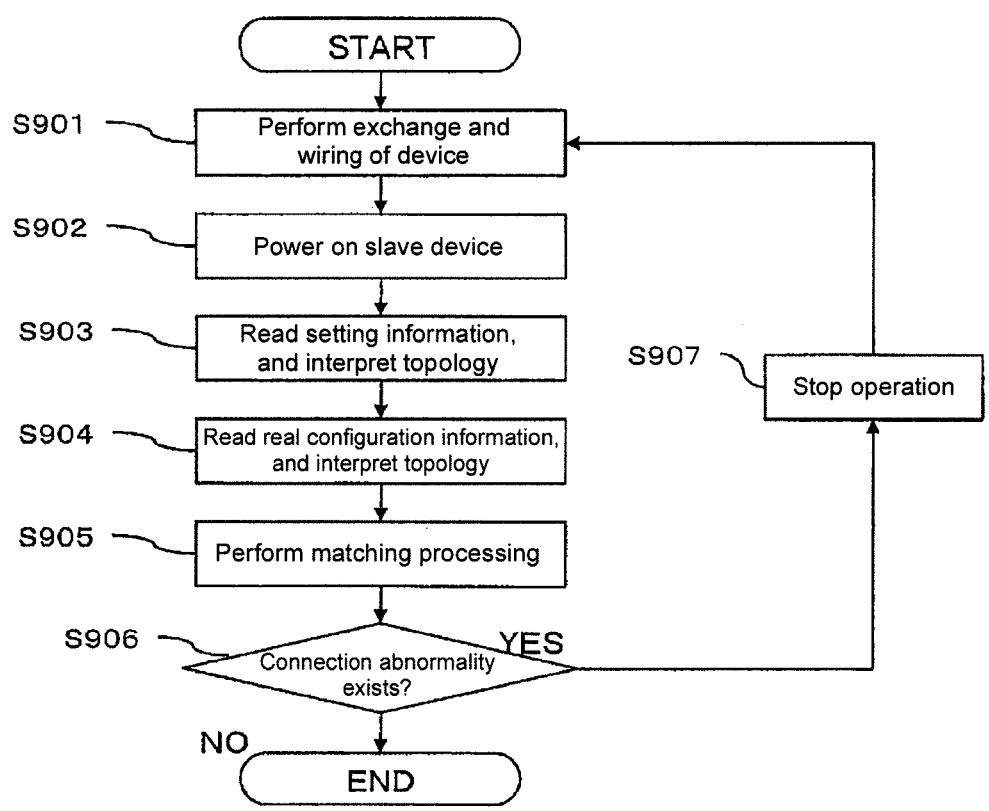
FIG. 9 is a flowchart illustrating processing of Example 2.

Accordingly, after the wiring is established in the initial setting to start the operation, desirably the change of the port of the destination hub device is not permitted in the change of the device. Therefore, in the case where the slave device is changed, preferably it is necessary that the slave devices be matched with each other before and after the change in the level of not only the connection hub device but also the connection port. FIG. 9 illustrates the processing flow.

In step S901, the user detaches the broken-down device or the device to be upgraded from the hub device to perform the wiring of the new device. In step S902, the newly-connected slave device is powered on.

In step S903, the master device reads the setting information already stored in the storage unit, and interprets the topology. It is assumed that the setting information is updated so as to be matched with the real configuration information in the case where the initial setting is performed in the free topology. The update may be performed by overwriting the setting information using the post-initial-setting real configuration information, or the update may be performed by reading the real configuration information before the slave device is changed and handling the real configuration information as the setting information. Any method may be adopted when the master device detects that the slave device is detached and newly connected. For example, in the case where the user notifies the master device by a command or the input from the GUI, a reception unit may be provided in the master device. An existing interface device may be used as the reception unit, or a dedicated component such as a switch may be provided as the reception unit. The reception unit may be a reception unit that explicitly switches between the fixed topology and the free topology. Alternatively, the determination that the slave device is changed may be made based on the result that the master device periodically conducts communication with the device in the network.

In step S904, the real configuration information generating unit generates the real configuration information based on the information acquired by the information collecting unit. In step S905, the matching processing is performed between the setting information and the real configuration information. The pieces of processing in steps S904 and S905 are similar to those of the initial setting of Example 1.

One of the features of Example 2 is that the connection port of the hub device is considered when the determination unit makes the determination in step S906. Therefore, after the initial setting is performed in the free topology to start the actual operation, the matching level is boosted to the level similar to that in the fixed topology when the determination unit makes the determination. The determination logic may be switched in such a manner that the master device determines whether the present situation is in the setting point or operation. An interface that can be switched by the user may be prepared.

When the connection abnormality exists (YES in S906), the operation of the device is stopped to encourage the user to check the connection (step S907).

According to the method for boosting the matching level in the real operation to the level in the fixed topology like Example 2, in the case where the slave device is connected to the port different from the pre-change port when the slave device is changed, the determination unit makes the determination of the connection abnormality through the matching processing. Therefore, the user corrects the connection destination of the slave device to the port identical to the pre-change port, and the stable operation can be performed.

The determination unit permits the free topology in the initial setting, and switches the determination logic so as to make the determination according to the fixed topology after the real operation is started. Therefore, a balance between the improvement of the usability in the initial setting and the stable real operation can be established.

(Separation Assignment and Re-Admission Assignment of Slave Device)

The change of the slave device due to the breakdown or upgrade will further be described. In industrial Ethernet such as EtherCAT, sometimes there is a function of assigning the separation from the network and a function of assigning re-admission to the network during the change of the slave device.

Depending on the standard of industrial Ethernet, in the case where the disconnection of the cable or detachment of the cable from the port is performed after the real operation of the network is started, the standard of industrial Ethernet may have a function of recognizing the disconnection of the communication with the slave device. The separation assignment means that the slave device to be changed is assigned to temporarily interrupt the communication, whereby the separation of the slave device from the network is not detected as the abnormality without the operation of the function of recognizing the disconnection. The re-admission assignment means the processing of resuming the function of recognizing the disconnection of the communication after the post-change slave device is connected to the network.

The operation during the separation and the re-admission of the slave device are studied in the free topology and the fixed topology on the assumption that the post-change slave device does not take over the setting contents, such as the node address and the logical address, which are set to the pre-change slave device and that the initial communication with the post-change slave device is started while the system returns to the position address mode. As described above, the determination unit in the fixed topology detects whether the connection abnormality exists in consideration of which port of the hub device is connected to the slave device. In other words, in the fixed topology, it can be estimated that the pre-changed slave device is changed by the post-re-admission slave device connected to the port identical to the port of the hub device to which the pre-separation slave device is connected.

On the other hand, in the free topology, in the case where the port to which the slave device that re-enters the network is different from the pre-separation port, because the actual topology is different from the topology of the setting information, the slave device cannot be specified based on the connection position. Depending on industrial Ethernet, sometimes the user sets the number called the alias to the slave device, and the master device sets the node address to the slave device based on the alias for the purpose of the use in the communication. In such standards, the handling becomes troublesome when the user performs the re-admission to the network without setting the alias to the slave device.

For the fixed topology, as described above, the node address can be set by identifying the slave device based on the position on the network such as the port number. On the other hand, in the case where the alias is not set in the free topology, there is a risk that the master device cannot identify the slave device when the re-admission is performed by connecting the slave device to the port different from the pre-separation port.

From this point of view, preferably the network system is operated in the fixed topology when the slave device is changed. Therefore, a mechanism for making a transition from the free topology to the fixed topology is required when the network system enters the operation stage in which the slave device is possibly changed.

In the above description, the operation in the fixed topology is started when the initial setting of the network system is ended to enter the real operation. Alternatively, the topology may make a transition according to the situation in which the change of the slave device is generated. For example, in the standard in which the separation assignment is performed in order to change the slave device, it is clear that the user detaches the slave device or circuit. Therefore, preferably the operation is performed in the fixed topology according to the separation assignment. Alternatively, the topology is checked according to the separation assignment, and the user may be encouraged to make the transition when the topology is the free topology. In this case, the master device may include a reception unit.

As described above, according to the method of Example 2, because the network system can be operated in the fixed topology in consideration of the change of the slave device in the actual operation, the maintenance work with the change of the slave device is easily performed.

A network system of the present invention including: a master device; a plurality of slave devices; and a hub device including a port connected to an upstream device and a plurality of ports connected to a downstream device, the network system is characterized in that the master device includes: a storage unit in which setting information is stored, information on a device constituting the network system and topological information on the device being set in the setting information; a real configuration information generating unit configured to generate real configuration information based on information collected from each device in an actual network system, the real configuration information including information on the device constituting the actual network system and topological information on the device; and a determination unit configured to determine whether a destination of each device in the actual network system is correct by comparing the real configuration information to the setting information, and the determination unit determines that the destination of the slave device is correct, even though a position of the port to which the slave device is connected is incorrect, when the real configuration information is identical to the setting information in the hub device to which the slave device connected to a downstream port of the hub device is connected.

According to the network system, when the hub device to which the slave device is connected is correct, the recognition of the normal connection can be achieved even if the destination port is incorrect. Therefore, the user who performs the wiring connection of the network device can work without being conscious of which port of the hub device is connected to the slave device, and the usability can be improved in the system construction.

In the network system, the following configuration can be constructed. That is, the network system is characterized in that the determination unit includes a first mode and a second mode with respect to the slave device connected to the downstream port of the hub device, a determination that the destination of the slave device is correct being made even though the position of the port to which the slave device is connected is different when the real configuration information is identical to the setting information in the hub device to which the slave device is connected in the first mode, the determination that the destination of the slave device is correct being made only when the real configuration information is identical to the setting information in the positions of the port and the hub device to which the slave device is connected in the second mode.

According to the network system, when the hub device to which the slave device is connected is identical, the first mode in which the incorrect connection of the destination port is permitted and the second mode in which the incorrect connection of the destination port in the hub device is recognized as the connection abnormality can be used as the situation demands. Therefore, the proper control can be performed according to the situation of the network system, and a balance between the improvement of the usability and the stable operation of the system can be achieved.

In the network system, the following configuration can be constructed. That is, the network system is characterized in that the determination unit makes the determination using the first mode in an initial setting of the network system, and makes the determination using the second mode after an operation of the network system is started.

According to the network system, the incorrect connection of the destination port is permitted at the stage in which the user performs the wiring connection of the slave device to the hub device and the initial setting, which allows handling similar to usual Ethernet to be performed to operate the network system in the first mode in which the usability is improved. At the real operation stage in which an inconvenience is generated when the port to which the slave device is attached changes, the network system can be operated in the second mode in which the network system can stably be operated.

In the network system, the following configuration can be constructed. That is, the network system is characterized in that the determination unit makes the determination using the second mode when the slave device connected to the downstream port of the hub device is changed.

According to the network system, because the network system can securely be operated in the second mode at the time the slave device is changed, maintenance work involving the change of the slave device is easily performed while the stable operation of the network system is maintained.

In the network system, the following configuration can be constructed. That is, the network system is characterized in that the master device further includes a reception unit configured to receive an input whether the determination unit makes the determination using the first mode or the determination using the second mode.

According to the network system, because the user can explicitly assign the mode in which the determination unit makes the determination, the balance between the improvement of the usability and the stable operation is easy to achieve.

The present invention can be regarded as follows. That is, a master device in a network system including: the master device; a plurality of slave devices; and a hub device including a port connected to an upstream device and a plurality of ports connected to a downstream device, the master device including: a storage unit in which setting information is stored, information on a device constituting the network system and topological information on the device being set in the setting information; a real configuration information generating unit configured to generate real configuration information based on information collected from each device in an actual network system, the real configuration information including information on the device constituting the actual network system and topological information on the device; and a determination unit configured to determine whether a destination of each device in the actual network system is correct by comparing the real configuration information to the setting information, the master device is characterized in that the determination unit determines that the destination of the slave device is correct, even though a position of the port to which the slave device is connected is incorrect, when the real configuration information is identical to the setting information in the hub device to which the slave device connected to a downstream port of the hub device is connected.

The master device can be configured as follows. That is, the master device is characterized in that the determination unit includes a first mode and a second mode with respect to the slave device connected to the downstream port of the hub device, a determination that the destination of the slave device is correct being made even though the position of the port to which the slave device is connected is different when the real configuration information is identical to the setting information in the hub device to which the slave device is connected in the first mode, the determination that the destination of the slave device is correct being made only when the real configuration information is identical to the setting information in the positions of the port and the hub device to which the slave device is connected in the second mode.

These master devices can also achieve the object of the present invention.

The present invention can be regarded as follows. That is, a method for controlling a network system including: a master device; a plurality of slave devices; and a hub device including a port connected to an upstream device and a plurality of ports connected to a downstream device, the method for controlling the network system including: a storage step in which the master device stores setting information therein, information on a device constituting the network system and topological information on the device being set in the setting information; a real configuration information generating step in which the master device generates real configuration information based on information collected from each device in an actual network system, the real configuration information including information on the device constituting the actual network system and topological information on the device; and a determination step in which the master device determines whether a destination of each device in the actual network system is correct by comparing the real configuration information to the setting information, the method for controlling the network system is characterized in that, in the determination step, a determination that the destination of the slave device is correct is made, even though a position of the port to which the slave device is connected is incorrect, when the real configuration information is identical to the setting information in the hub device to which the slave device connected to a downstream port of the hub device is connected.

The method for controlling the network system can be configured as follows. That is, the method for controlling the network system is characterized in that the determination step includes a first mode and a second mode with respect to the slave device connected to the downstream port of the hub device, a determination that the destination of the slave device is correct being made even if the position of the port to which the slave device is connected is different when the real configuration information is identical to the setting information in the hub device to which the slave device is connected in the first mode, the determination that the destination of the slave device is correct being made only when the real configuration information is identical to the setting information in the positions of the port and the hub device to which the slave device is connected in the second mode.

These network systems can also achieve the object of the present invention.

The present invention can be regarded as follows. That is, a network system including: a master device; a plurality of slave devices; and a hub device including a port connected to an upstream device and a plurality of ports connected to a downstream device, the network system is characterized in that the master device includes: a storage unit in which setting information is stored, information on a device constituting the network system and topological information on the device being set in the setting information; a real configuration information generating unit configured to generate real configuration information based on information collected from each device in an actual network system, the real configuration information including information on the device constituting the actual network system and topological information on the device; a determination unit configured to determine that the real configuration information is identical to the setting information in the hub device to which the slave device connected to a downstream port of the hub device is connected; and an address correlating unit configured to correlate an address of an information signal based on a position of the slave device in the setting information with an address of an information signal based on a position of the slave device in the real configuration information with respect to the slave device that is determined to be applicable by the determination unit.

According to the network system, when the hub device to which the slave device is matched with the setting information, the communication can correctly be conducted based on the address of the position of the slave device even if the destination port is different from the setting information. Alternatively, the address correlation may be performed irrespective of the destination port of the slave device.

In the network system the following configuration can be constructed. That is, the network system is characterized in that the determination unit further determines that the real configuration information differs from the setting information in the port to which the slave device is connected.

According to the network system, the address correlation processing is performed in the case where the hub device to which the slave device is connected is correct while the destination port is incorrect.

The present invention can be regarded as follows. That is, a master device in a network system including: the master device; a plurality of slave devices; and a hub device including a port connected to an upstream device and a plurality of ports connected to a downstream device, the master device is characterized by including: a storage unit in which setting information is stored, information on a device constituting the network system and topological information on the device being set in the setting information; a real configuration information generating unit configured to generate real configuration information based on information collected from each device in an actual network system, the real configuration information including information on the device constituting the actual network system and topological information on the device; a determination unit configured to determine that the real configuration information is identical to the setting information in the hub device to which the slave device connected to a downstream port of the hub device is connected; and an address correlating unit configured to correlate an address of an information signal based on a position of the slave device in the setting information with an address of an information signal based on a position of the slave device in the real configuration information with respect to the slave device that is determined to be applicable by the determination unit.

The master device can be configured as follows. That is, the master device is characterized in that the determination unit further determines that the real configuration information differs from the setting information in the port to which the slave device is connected.

DESCRIPTION OF SYMBOLS 200 master device
201 information collecting unit
202 real configuration information generating unit
203 determination unit
204 storage unit
300 slave device
700 hub device

The invention claimed is:
1. A network system comprising:
a master device;
a plurality of slave devices; and
a hub device comprising an upstream port connected to an upstream device and a plurality of downstream ports, each of the downstream ports being connected to a downstream device,
wherein the master device comprises:
a memory that stores setting information of the master device, the hub device and the plurality of slave devices constituting the network system, the setting information comprising designed topological information specifying a designed device level connection configuration and a designed port connection configuration for each of the master device, the plurality of the slave devices, and the hub device; and
a processor configured
to collect actual connection information from each of the master device, the hub device, and the plurality of slave devices when the master device, the hub device, and the plurality of slave devices are connected to a network,
to generate real configuration information based on the actual connection information, the real-configuration information comprising actual topological information specifying an actual device level connection configuration and an actual port connection configuration for each of the master device, the plurality of slave devices, and the hub device connected to the network, and
to determine whether a network destination of each of the plurality of slave devices in the network-system is correct by comparing the real configuration information to the setting information for both a device level connection configuration and a port connection configuration, and wherein the processor determines that the network destination of a slave device of the plurality of slave devices is correct when the actual device level connection configuration corresponds to the designed device level connection configuration, and the actual port connection configuration is different from the designed port connection configuration.

2. The network system according to claim 1, wherein the processor operates in either a first mode or a second mode with respect to the plurality of slave devices connected to the downstream ports of the hub device,
the processor, in the first mode, determines that the network destination of the slave device of the plurality of slave devices is correct when the actual device level connection configuration corresponds to the designed device level connection configuration, and the actual port connection configuration is different from the designed port connection configuration, and
the processor, in the second mode, determines that the network destination of the slave device of the plurality of slave devices is correct when the actual device level connection configuration corresponds to the designed device level connection configuration and the actual port connection configuration corresponds to the designed port connection configuration.

3. The network system according to claim 2, wherein the processor operates in the first mode in an initial setting of the network system, and the processor operates in the second mode after an operation of the network system is started.

4. The network system according to claim 2, wherein the processor operates in the second mode when a downstream port connection of the hub device is changed.

5. The network system according to claim 2, wherein the master device further comprises a receiver configured to receive an input whether the processor operates in the first mode or the second mode.

6. A master device in a network system, the master device comprising:
a memory that stores setting information of the master device, a hub device, and a plurality of slave devices constituting a network system, the setting information comprising designed topological information specifying a designed device level connection configuration and a designed port connection configuration for each of the master device, the hub device, and the plurality of slave devices;
a processor configured
to generate real configuration information based on actual connection information collected from each of the master device, the hub device, and the plurality of slave devices when the master device, the hub device, and the plurality of slave devices are connected to a network, the real configuration information comprising actual topological information specifying an actual device level connection configuration and an actual port connection configuration for each of the master device, the plurality of slave devices, and the hub device connected to the network, and
to determine whether a network destination of each of the plurality of slave devices in the network system is correct by comparing the real configuration information to the setting information for both a device level connection configuration and a port connection configuration,
wherein the processor determines that the network destination of a slave device of the plurality of slave devices is correct when the actual device level connection configuration corresponds to the designed device level connection configuration, and the actual port connection configuration is different from the designed port connection configuration.

7. The master device according to claim 6, wherein the processor operates in either a first mode or a second mode with respect to the plurality of slave devices connected to the downstream ports of the hub device,
the processor, in the first mode, determines that the network destination of the slave device of the plurality of slave devices is correct when the actual device level connection configuration corresponds to the designed device level connection configuration, and the actual port connection configuration is different from the designed port connection configuration, and
the processor, in the second mode, determines that the network destination of the slave device of the plurality of slave devices is correct when the actual device level connection configuration corresponds to the designed device level connection configuration and the actual port connection configuration corresponds to the designed port connection configuration.

8. A method for controlling a network system, the method comprising:
storing, in a memory of a master device, setting information of the master device, a hub device, and a plurality of slave devices constituting the network system, the setting information comprising designed topological information specifying a designed device level connection configuration and a designed port connection configuration for each of the master device, the plurality of the slave devices, and the hub device;
collecting, by a processor of the master device, actual connection information from each of the master device, the hub device, and the plurality of slave devices when the master device, the hub device, and the plurality of slave devices are connected to a network;
generating, by the processor of the master device, real configuration information based on the actual connection information, the real configuration information comprising actual topological information specifying an actual device level connection configuration and an actual port connection configuration for each of the master device, the plurality of slave devices, and the hub device connected to the network; and
determining, by the processor of the master device, whether a network destination of each of the plurality of slave devices in the network system is correct by comparing the real configuration information to the setting information for both a device level connection configuration and a port connection configuration,
wherein, in the determining, the network destination of a slave device of the plurality of salve devices is determined to be correct when the actual device level connection configuration corresponds to the designed device level connection configuration, and the actual port connection configuration is different from the designed port connection configuration.

9. The method for controlling the network system according to claim 8, wherein in the determining, the processor operates in either a first mode or a second mode with respect to the plurality of slave devices connected to downstream ports of the hub device,
the processor, in the first mode, determines that the network destination of the slave device of the plurality of slave devices is correct when the actual device level connection configuration corresponds to the designed device level connection configuration, and the actual port connection configuration is different from the designed port connection configuration, and the processor, in the second mode, determines that the network destination of the slave device of the plurality of slave devices is correct when the actual device level connection configuration corresponds to the designed device level connection configuration and the actual port connection configuration corresponds to the designed port connection configuration.

10. A network system comprising:
a master device;
a plurality of slave devices; and
a hub device comprising an upstream port connected to an upstream device and a plurality of downstream ports, each of the downstream ports being connected to a downstream device,
wherein the master device comprises:
  a memory that stores setting information of the master device, the hub device and the plurality of slave devices constituting the network system, the setting information comprising designed topological information specifying a designed device level connection configuration and a designed port connection configuration for each of the master device, the plurality of the slave devices, and the hub device;
  a processor configured
    to generate real configuration information based on actual connection information collected from each of the master device, the hub device, and the plurality of slave devices when the master device, the hub device, and the plurality of slave devices are connected to a network, the real configuration information comprising actual topological information specifying an actual device level connection configuration and an actual port connection configuration for each of the master device, the plurality of slave devices, and the hub device connected to the network;
    to determine whether the real configuration information corresponds to the setting information of the hub device to which a target slave device of the plurality of slave devices is connected at a downstream port of the hub device; and
    to correlate an address of an information signal based on a designed network position of the target slave device as specified in the setting information with an address of an information signal based on an actual network position of the target slave device as specified in the real configuration information, and
  wherein the processor determines that the designed network position of the target slave device of the plurality of slave devices is correct when the actual device level connection configuration corresponds to the designed device level connection configuration, and the actual port connection configuration is different from the designed port connection configuration.

11. The network system according to claim 10, wherein the processor further determines that the actual port connection configuration of the real configuration information for the port of the hub device, to which the target slave device is connected differs from the designed port connection configuration of the setting information.

12. A master device in a network system, the master device comprising:
the master device;
a plurality of slave devices; and
a hub device comprising an upstream port connected to an upstream device and a plurality of downstream ports, each of the downstream ports being connected to a downstream device,
the master device comprising:
  a memory that stores setting information of the master device, the hub device and the plurality of slave devices constituting the network system, the setting information comprising designed topological information specifying a designed device level connection configuration and a designed port connection configuration for each of the master device, the plurality of the slave devices, and the hub device;
  a processor configured
    to generate real configuration information based on actual connection information collected from each of the master device, the hub device, and the plurality of slave devices when the master device, the hub device, and the plurality of slave devices are connected to a network, the real configuration information comprising actual topological information specifying an actual device level connection configuration and an actual port connection configuration for each of the master device, the plurality of slave devices, and the hub device connected to the network;
    to determine that the real configuration information corresponds to the setting information of the hub device to which a target slave device of the plurality of slave devices is connected at a downstream port of the hub device; and
    to correlate an address of an information signal based on a designed network position of the target slave device as specified in the setting information with an address of an information signal based on an actual network position of the target slave device as specified in the real configuration information,
  wherein the processor determines that the designed network position of the target slave device of the plurality of slave devices is correct when the actual device level connection configuration corresponds to the designed device level connection configuration, and the actual port connection configuration is different from the designed port connection configuration.

13. The master device according to claim 12, wherein the processor further determines that the actual port connection configuration of the real configuration information for the port of the hub device, to which the target slave device is connected differs from the designed port connection configuration of the setting information.

* * * * *